United States Patent
Rudnick et al.

(10) Patent No.: US 9,213,329 B2
(45) Date of Patent: Dec. 15, 2015

(54) SYSTEM AND METHOD FOR VENDOR RELEASE INDEPENDENT REUSABLE CUSTOMIZED FUNCTION BLOCK LIBRARIES

(71) Applicant: HONEYWELL GMBH, Offenbach (DE)

(72) Inventors: Jürgen Rudnick, Hesse (DE); Torsten Winkler, Hesse (DE); Bodo Fritzsche, Brandenburg (DE)

(73) Assignee: Honeywell GmbH, Offenbach (DE)

( * ) Notice: Subject to any disclaimer, the term of this patent is extended or adjusted under 35 U.S.C. 154(b) by 515 days.

(21) Appl. No.: 13/660,654

(22) Filed: Oct. 25, 2012

(65) Prior Publication Data
US 2014/0121812 A1     May 1, 2014

(51) Int. Cl.
*G06F 19/00*      (2011.01)
*G05B 19/042*    (2006.01)

(52) U.S. Cl.
CPC ................... *G05B 19/0426* (2013.01)

(58) Field of Classification Search
CPC ... G05B 19/0426; G05B 19/05; G05B 19/056
See application file for complete search history.

(56) References Cited

U.S. PATENT DOCUMENTS

| 5,612,866 | A | * | 3/1997 | Savanyo et al. | 700/86 |
| 5,801,942 | A | * | 9/1998 | Nixon et al. | 700/83 |
| 6,044,305 | A | * | 3/2000 | Larson et al. | 700/87 |
| 6,076,952 | A | * | 6/2000 | Gretta et al. | 700/83 |
| 6,259,958 | B1 | | 7/2001 | Steinman et al. | |
| 6,510,351 | B1 | * | 1/2003 | Blevins et al. | 700/18 |
| 6,633,782 | B1 | * | 10/2003 | Schleiss et al. | 700/26 |
| 7,171,673 | B1 | | 1/2007 | Steinman et al. | |
| 2003/0195639 | A1 | * | 10/2003 | Nixon et al. | 700/19 |
| 2004/0193290 | A1 | * | 9/2004 | Ott et al. | 700/18 |
| 2004/0230322 | A1 | * | 11/2004 | Oka et al. | 700/18 |
| 2008/0016493 | A1 | * | 1/2008 | Pouchak et al. | 717/109 |
| 2008/0189526 | A1 | * | 8/2008 | Sokolova et al. | 712/226 |
| 2011/0202145 | A1 | * | 8/2011 | Shah et al. | 700/9 |

* cited by examiner

*Primary Examiner* — Ramesh Patel

(57) ABSTRACT

A method includes obtaining instructions for a customized function block in a parametric block type. The method also includes developing, at a parametric block engine, the customized function block based on the instructions in the parametric block type. The method further includes executing the customized function block. Executing the customized function block may include executing the customized function block using firmware associated with a controller in a process control system. The parametric block engine may be preloaded into the controller before the controller is activated in the process control system.

20 Claims, 7 Drawing Sheets

SYSTEM AND METHOD FOR VENDOR RELEASE INDEPENDENT REUSABLE CUSTOMIZED FUNCTION BLOCK LIBRARIES

TECHNICAL FIELD

This disclosure relates generally to process control systems and more specifically to a system and method for vendor release independent reusable customized function block libraries.

BACKGROUND

Processing facilities are often managed using process control systems. Example processing facilities include chemical, pharmaceutical, paper, and petrochemical production plants. Among other operations, process control systems typically interact with and control industrial equipment in the processing facilities, such as equipment used to produce chemical, pharmaceutical, paper, or petrochemical products.

To facilitate efficient use of the industrial equipment in a processing facility, a process control system is often used to automate execution of various production processes. Processing facilities often implement one or multiple fast-paced and high-value production processes. This often demands a procedure automation solution that is highly flexible and that can ensure timely execution of the production processes. However, aggressive real-time requirements typically cannot be met with conventional automation solutions.

SUMMARY

This disclosure provides a system and method for vendor release independent reusable customized function block libraries.

In a first embodiment, a method includes obtaining instructions for a customized function block in a parametric block type. The method also includes developing, at a parametric block engine, the customized function block based on the instructions in the parametric block type. The method further includes executing the customized function block.

In a second embodiment, a system includes at least one memory configured to store a parametric block type comprising instructions for a customized function block. The system also includes at least one processing unit programmed to execute a parametric block engine configured to develop the customized function block based on the instructions in the parametric block type. The system is configured to execute the customized function block.

In a third embodiment, a non-transitory computer readable medium is encoded with a computer program. The computer program includes computer readable program code for obtaining instructions for a customized function block in a parametric block type. The computer program also includes computer readable program code for developing, at a parametric block engine, the customized function block based on the instructions in the parametric block type. The computer program further includes computer readable program code for executing the customized function block.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
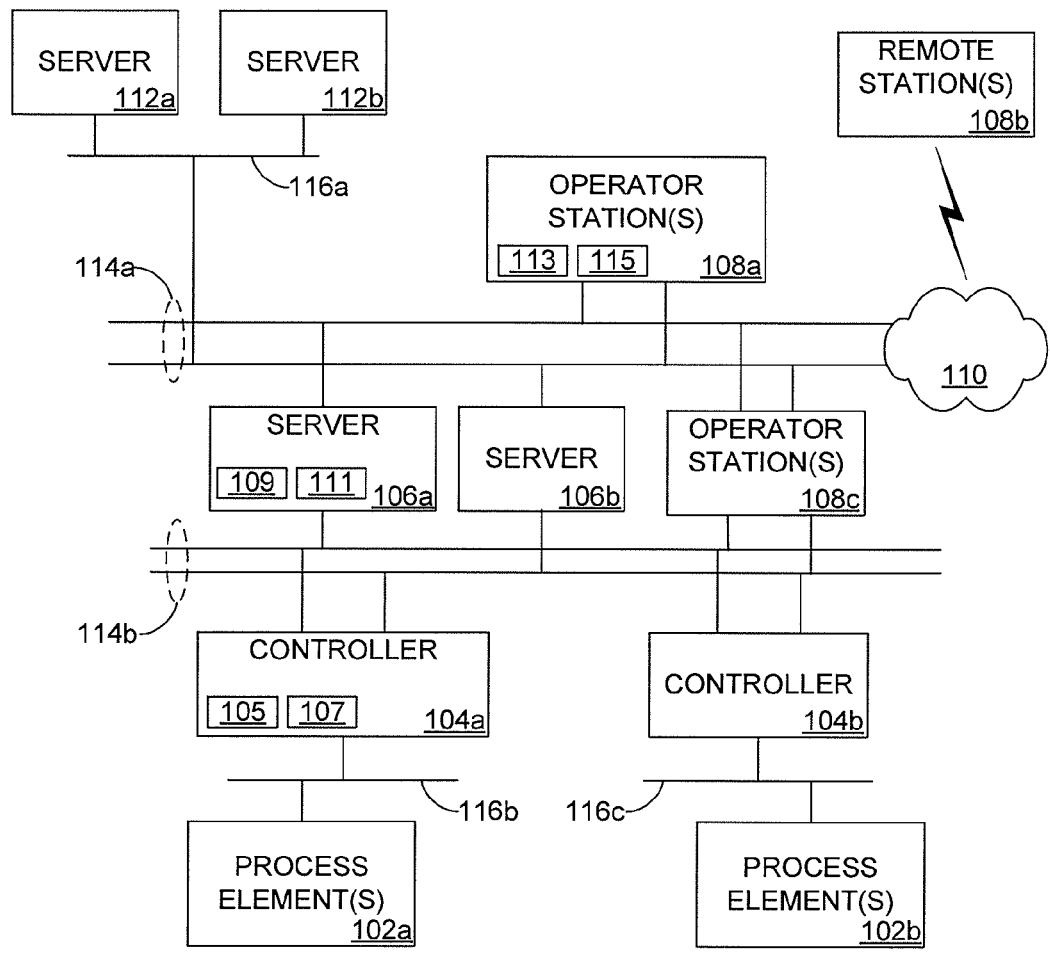
FIG. 1 illustrates an example process control system in accordance with this disclosure.

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In many cases, the creation and maintenance of control strategies represents the largest cost factor over the lifetime of a process control system. Companies operating multiple process control systems, either in a single site or in multiple sites, aim to reduce the life cycle cost of their automation systems by increasing their ability to reuse costly engineering work. At the same time, companies want to maintain effective utilization of the embedded control platforms, as any compromises tend to increase the size and the cost of the control system.

Many existing process control technologies require software development skills, which may not be available in the organizations of plant operators in chemical, pharmaceutical, refining and other production or manufacturing industries, as these skills are not part of their business model. Likewise, the system provider responsible for the development of the embedded controllers and/or the process control system may serve a large spectrum of different customers and market segments with a small set of products and product lines to remain competitive. While the system provider may have personnel with the appropriate software development skills, it is not cost effective to provide the degree of desired customization within the short times requested by the customers. Therefore, existing technologies and offerings do not provide an optimum combination of criteria, such as time to market, high performance and robustness, intellectual property protection, low life cycle cost, and high degree of customization.

For example, some process control systems, such as EXPERION by HONEYWELL, include a fixed set of function blocks that are supplied from the provider. Some process control systems, such as EXPERION, also include a custom control library infrastructure, which allows a knowledgeable developer (having software development skills beyond those of a typical end user) to expand the function block set for the system in a release-independent way. These customized blocks can be installed or added to the system even after the release. However, development of these customized blocks may require access to the provider's source code and knowledge of the provider's controller technology, and it may require the developer to have strong knowledge of development languages such as C++. Thus, although useful, these customized blocks may be limited by their constraints.

To resolve these issues, embodiments of this disclosure include a parametric block execution engine that provides auxiliary processing functions around proven, rich, complex function blocks provided by a supplier of embedded controller firmware. The block execution engine itself is flexible, and a single version of the engine may host multiple customized function blocks providing a library or toolkit. Thus, the block execution engine is reusable across multiple function block libraries and does not need to be changed for normal functionality changes. The toolkit separates knowledge of controller technology from knowledge of control function block functionality, introduces a new abstraction layer that separates the knowledge zones from each other, provides an additional inspection layer, and facilitates a more rapid and less risky development and service cycle. Multiple toolkits or libraries may be produced from the same binary code of the block execution engine in a short time and delivered to different customers or market segments, which can be done without requiring extensive platform testing due to the risk of changes in the machine code.

The toolkits may be provided and installed independent of the scheduled release cycles of the control system software. Thus, the disclosed embodiments decouple the maintenance cycle of the controller firmware from the support cycles of the toolkits and libraries. Minor changes and corrections to toolkit functionality may be delivered to a plant site by any means of communication (including verbal instructions by phone) without risking the integrity of the existing control systems and without requiring any software development or maintenance skills at the plant site. Changes that are more significant may be performed locally by qualified project engineers or can be delivered (such as by email) in small text files that are readable by human personnel and do not carry substantial risks of virus infection or other system destabilization. The changes can be implemented on an executing non-redundant controller system without the need to shut down, turn off, take off-line, or stop execution of the controller, the system, or any part thereof. This makes support of even the most remote site possible and cost effective within a large range of commercial support and delivery models.

The embodiments of this disclosure are described with respect to an industrial plant's process control system. However, this disclosure is not limited to industrial plant environments. The principles disclosed here are applicable to other environments and industries, such as transportation and movement of goods, as well as homes and buildings.

FIG. 1 illustrates an example process control system 100 in accordance with this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent equipment used to manufacture chemical, pharmaceutical, paper, or petrochemical products. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b for controlling the production of chemical, pharmaceutical, paper, or petrochemical products. Each of the controllers 104a-104b includes any hardware, software, firmware, or combination thereof for controlling one or more of the process elements 102a-102b. The controllers 104a-104b could, for example, include one or more processing units 105 and one or more memories 107 storing instructions and data used, collected, or generated by the processing units(s) 105. As particular examples, the processing units 105 could include processors of the POWERPC processor family running the GREEN HILLS INTEGRITY operating system, processors of the X86 processor family running a MICROSOFT WINDOWS operating system, or processors executing a virtual machine such as a JAVA virtual machine.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processing units 109 and one or more memories 111 storing instructions and data used, collected, or generated by the processing units(s) 109 (such as software executed by the servers 106a-106b). As particular examples, the processing units 109 could include processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing direct user access to the controllers 104a-104b. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. Each of the operator stations 108a-108c could, for example, include one or more processing units 113 and one or more memories 115 storing instructions and data used, collected, or generated by the processing units(s) 113 (such as software executed by the operator stations 108a-108c). In particular embodiments, the operator stations 108a-108c could represent personal computers executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any network or combination of networks facilitating communication between components in the system 100. The networks 114a-114b, 116a-116c could, for example, represent Ethernet networks.

In one aspect of operation, the process control system 100 manages one or multiple processes for producing or processing one or more products (or parts thereof). As particular examples, the controllers 104a-104b and the servers 106a-106b could manage one or multiple processes used to produce chemical, pharmaceutical, paper, or petrochemical products using the process elements 102a-102b. The process control system 100 may implement a procedural automation mechanism that helps to automate the production processes. For example, the procedural automation mechanism may determine when certain tasks in a production process can be performed and which process elements 102a-102b are used during those tasks.

In some embodiments, one or more of the controllers 104a-104b in the process control system 100 may be managed according to a workflow delivery model that includes a parametric block engine and one or more customizable function blocks. Additional details regarding this functionality are provided below.

Although FIG. 1 illustrates one example of a process control system 100, various changes may be made to FIG. 1. For example, a process control system could include any number of process elements, controllers, servers, operator stations, and networks. Also, the makeup and arrangement of the process control system 100 is for illustration only. Components could be added, omitted, combined, or placed in any other configuration according to particular needs. Further, while described as being used to produce or process certain types of products, the process control system 100 could be used in any other manner. In addition, FIG. 1 illustrates one operational environment in which the procedural automation mechanism can be used. The procedural automation mechanism could be used in any other device or system.

Figure 2:
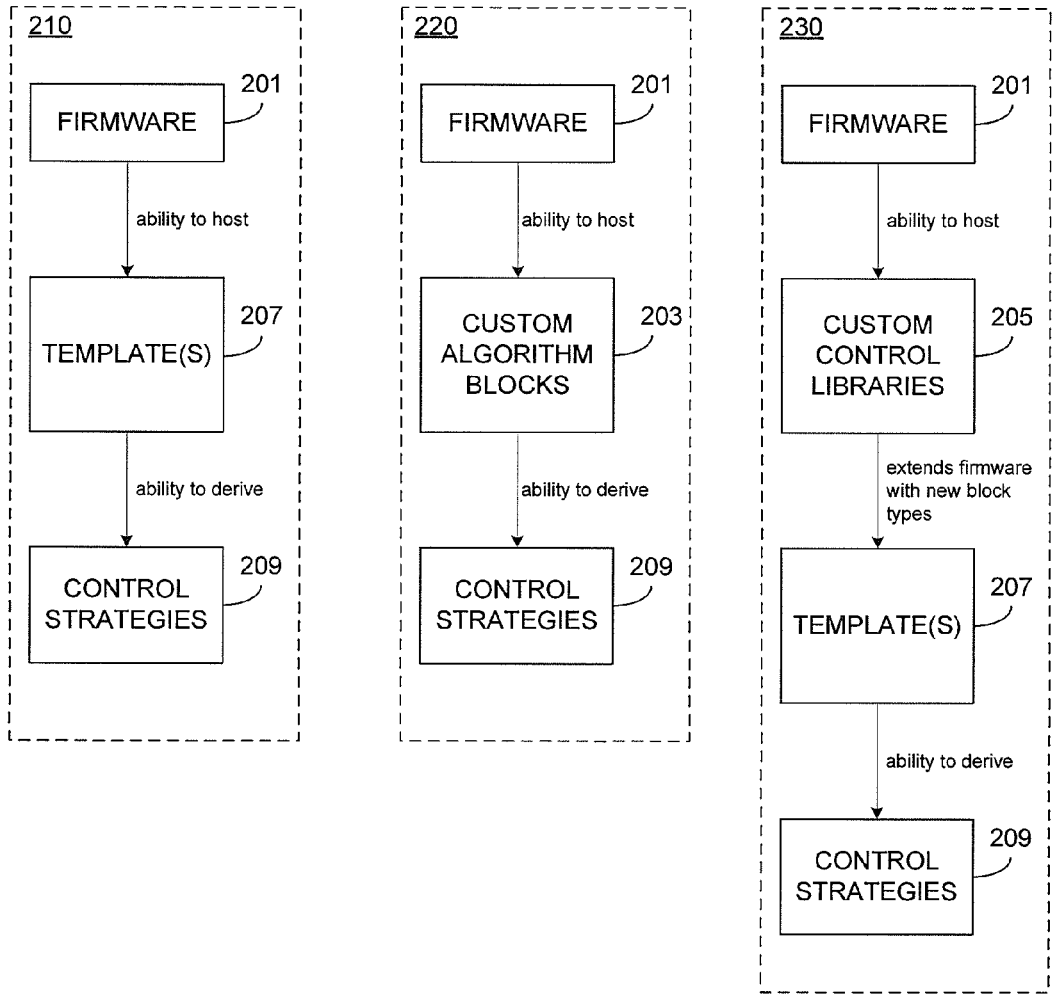
FIG. 2 illustrates examples of two-tier and three-tier workflow delivery models.

FIG. 2 illustrates examples of two-tier and three-tier workflow delivery models 210-230. The workflow delivery models 210, 220 are two-tier models, and the workflow delivery model 230 is a three-tier model. The workflow delivery models 210-230 may be used in connection with a process control system, such as the process control system 100 shown in FIG. 1.

The workflow delivery model 210 includes a controller firmware block 201, one or more templates 207, and control strategies 209. The controller firmware block 201 represents controller firmware that is developed, controlled, and updated by the controller manufacturer, such as HONEYWELL. The controller firmware block 201 is generally optimized for high performance and high robustness and is focused on the requirements and interests of a broad market. Each customer that uses the controller firmware block 201 may only accept or refuse updates to the controller firmware block 201. The customer has no mechanism to customize the controller firmware block 201 to suit the customer's individual needs and interests.

Each template 207 is a customizable template that utilizes pre-developed function blocks, such as those provided in the firmware 201. The templates 207 may be controlled by a customer, such as a plant owner, plant manager, plant engineer, or contractor of the plant. The customer may maintain control of the templates 207 within the constraints of the associated function blocks. The templates 207 are generally focused on one project or site and therefore may not be suitable for reuse among different customers. The templates 207 may be optimized for high robustness like the firmware block 201. The templates 207 consume somewhat increased CPU and memory resources as compared to the controller firmware block 201.

The control strategies 209 may be controlled by the customer. The customer may maintain full control of the control strategies 209 within the constraints set by the templates 207.

The workflow delivery model 220 is another two-tier model that includes the controller firmware block 201, custom algorithm blocks 203, and the control strategies 209. The controller firmware block 201 and control strategies 209 are the same as or similar to the firmware block 201 and control strategies 209 of the workflow delivery model 210.

The custom algorithm blocks 203 have characteristics similar to the templates 207. For example, the custom algorithm blocks 203 may be controlled by a customer, such as a plant owner, plant manager, or contractor of the plant. The customer may maintain control of the custom algorithm blocks 203 within the constraints of the associated runtime environment. Maintenance and customization of the custom algorithm blocks 203 usually require software development skills. The custom algorithm blocks 203 may be focused on one project or site and therefore may not be suitable for reuse among different customers. The custom algorithm blocks 203 may exhibit medium to high robustness and consume somewhat increased CPU and memory resources as compared to the controller firmware block 201.

The workflow delivery model 230 is a three-tier model that includes the controller firmware block 201, custom control libraries 205, one or more templates 207, and the control strategies 209. The controller firmware block 201, templates 207, and control strategies 209 are the same as or similar to the controller firmware block 201, templates 207, and control strategies 209 of the workflow delivery models 210-220.

The custom control libraries 205 provide the capability of dynamically developing and releasing one or more function block add-ons to a controller and installing the add-ons at the plant site without a need to re-release the controller's firmware. Thus, the custom control libraries 205 may be independent of the firmware release schedule. The custom control libraries 205 are generally focused on a market segment and therefore may be suitable for reuse among different customers. The custom control libraries 205 generally exhibit high robustness and high performance.

The custom control libraries 205 may be controlled by a development group that is a part of the firmware provider or the customer. For example, in some embodiments, the customer (such as a plant owner, manager, or contractor) may maintain control of the custom control libraries 205 within the constraints of the associated runtime environment. However, maintenance and customization of the custom control libraries 205 may require advanced software development skills, and many customers do not have a team of skilled developers who are capable of developing the add-ons. This places a burden on skilled developers at the firmware provider to support custom control libraries for many customers.

Although FIG. 2 illustrates examples of two-tier and three-tier workflow delivery models 210-230, various changes may be made to FIG. 2. For example, each workflow delivery model 210-230 may include more or fewer components, and the components may be arranged differently than shown in FIG. 2.

Figure 3:
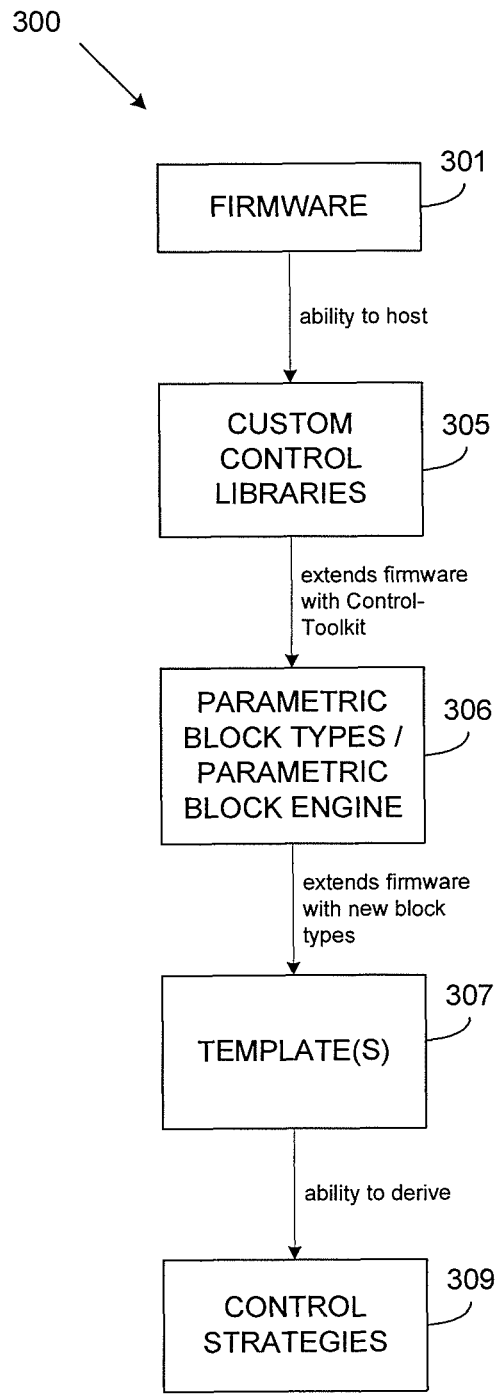
FIG. 3 illustrates an example four-tier workflow delivery model in accordance with this disclosure.

FIG. 3 illustrates an example four-tier workflow delivery model 300 in accordance with this disclosure. The embodiment of the workflow delivery model 300 in FIG. 3 is for illustration only. Other embodiments of the workflow delivery model 300 could be used without departing from the scope of this disclosure. The workflow delivery model 300 may be used in connection with a process control system, such as the process control system 100 shown in FIG. 1.

The workflow delivery model 300 includes a controller firmware block 301, custom control libraries 305, parametric block types 306, one or more templates 307, and control strategies 309. Some of the components in FIG. 3 are the same as or similar to the components depicted in FIG. 2. For example, the controller firmware block 301, templates 307, and control strategies 309 may be the same as or similar to the controller firmware block 201, templates 207, and control strategies 209 of FIG. 2.

The custom control libraries 305 can also be similar to the custom control libraries 205 of FIG. 2. However, in contrast to the custom control libraries 205 that may be focused on a single market segment, the custom control libraries 305 may be applicable to all markets.

The workflow delivery model 300 also includes one or more parametric block types 306. The parametric block types 306 provide a location where a controller's customer-specific functionality can be defined and facilitate the creation of customized function blocks without requiring advanced software development skills. The parametric block types 306 move the customization to a higher structure layer, thereby separating the customization from the internal controller execution. This benefit can be achieved without creating substantial overhead. The parametric block types 306 may include data in any suitable form, such as tabular data embodied in a configuration text file. In some embodiments, a graphical user interface (GUI) (such as a GUI at one of the operator stations 108a-108c) may be used to create and maintain the parametric block types.

A parametric block engine (PBE) instantiates and executes block classes defined in the parametric block types 306. The PBE can be an executable application that is pre-loaded into the controller. At run time, the PBE accepts and processes any newly created block classes. For example, if a plant engineer wants to customize an existing function block with new functionality (such as by adding a new parameter or adding pre- or post-processing logic to the function block), the new block definition can be downloaded at run-time into the PBE. The PBE then instantiates the new block class without a developer having to develop new code to execute the block.

The PBE is more flexible than a standard custom control library. A standard custom control library may simply have hard-coded functions to execute one or more hard-coded blocks. Here, the PBE may not define any block classes. Instead, the PBE executes any block defined by the block class definitions. Thus, the PBE provides a wider capability than a standard custom control library.

Here, changes to function block functionality do not require the use of a compiler or other software development tool. Furthermore, the changes can be implemented on an executing non-redundant controller system without the need to shut down, turn off, take off-line, or stop execution of the controller, the system, or any part thereof. That is, changes can be made and executed in an on-line (i.e., running) controller. This is in contrast to other process control systems, where function block changes must be implemented in an off-line controller or in a redundant controller system. In a redundant controller system, changes are made to an off-line "secondary" (or back-up) controller system while the "primary" controller system is executing. Control is then switched over to the "secondary" controller system to execute the changed function blocks.

Moreover, the performance and efficiency of the added functionality is comparable to the native functions that are resident in the firmware of the controller. That is, the customized function blocks execute at approximately the same machine speed as native blocks and use similar platform resources (such as CPU and memory). For example, in some embodiments, the added functionality may use only approximately five to ten percent (5-10%) of system resources. This is in contrast to interpreted language development tools that provide functionality at a significant cost to efficiency (in some cases, multiple times slower than native functions).

Changes to an executing block are possible because of a clean separation of code and data. That is, the changes to functionality for the function block are not encoded in code but are encoded in data. For example, new functionality may be encoded in a new table instance. When the new controller functionality is to be executed, the function block instances (such as in controllers) are instructed to switch between execution cycles from an existing table instance to the new table instance encoded with the new functionality. Then, the memory for the existing table instance can be de-allocated.

Although FIG. 3 illustrates one example of a four-tier workflow delivery model 300, various changes may be made to FIG. 3. For example, the four-tier workflow delivery model 300 may include additional components, such as one or more custom algorithm blocks or other features of the workflow delivery models 210-230.

Figure 4:
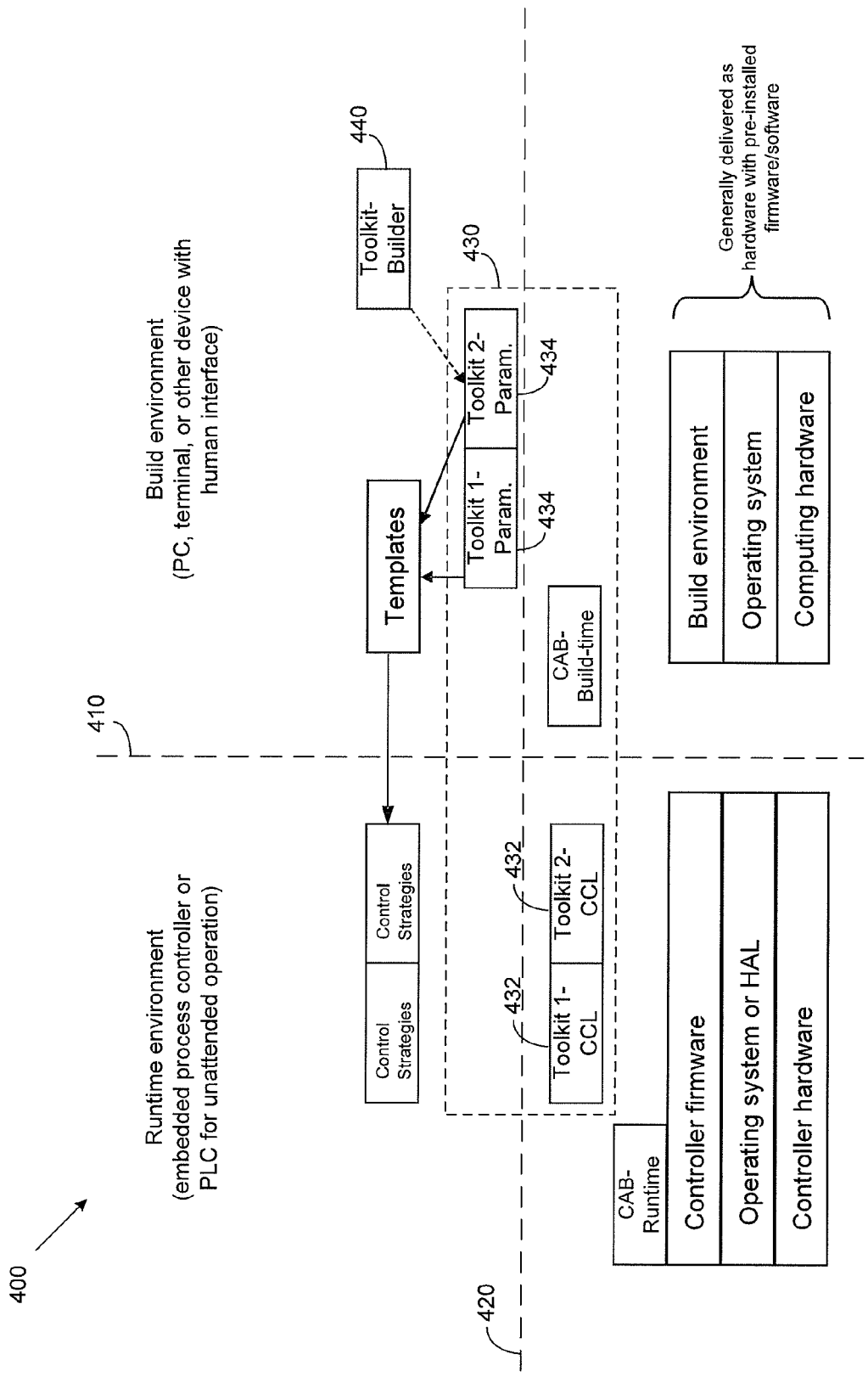
FIG. 4 illustrates an example architecture of the four-tier workflow delivery model in accordance with this disclosure.

FIG. 4 illustrates an example architecture 400 of the four-tier workflow delivery model 300 in accordance with this disclosure. The embodiment of the architecture 400 in FIG. 4 is for illustration only. Other embodiments of the architecture 400 could be used without departing from the scope of this disclosure.

As shown in FIG. 4, the architecture 400 is divided into sections by two lines 410, 420. Blocks to the left of the line 410 are part of the runtime environment, while blocks to the right of the line 410 are part of the build environment. Blocks below the line 420 may be supported by a skilled software developer, while blocks above the line 420 may be supported by an end user or a project engineer who does not need software development skills.

The architecture 400 includes one or more instances of a toolkit 430. As shown in FIG. 4, the toolkit 430 includes two instances, Toolkit 1 and Toolkit 2. However, the architecture 400 may include more or fewer toolkits. Toolkit custom control libraries (CCLs) 432 can be developed by a firmware provider to host the infrastructure for parametric block types. Toolkit parametric block types 434 can be developed and maintained by an end user or a project engineer who is familiar with controller function blocks but does not need to have software development skills. A certain arrangement of function blocks in the parametric block types 434 can be defined as a template. Once defined, a template can be instantiated. The various parts that form the toolkit 430 can be delivered and maintained together or separately.

A toolkit builder 440 is an optional GUI-based component to facilitate the development of the parametric block types 434. The toolkit builder 440 may be operated by the project engineer or end user.

Although FIG. 4 illustrates one example of an architecture 400 of the four-tier workflow delivery model 300, various changes may be made to FIG. 4. For example, the architecture 400 may include more or fewer components, and the components may be arranged in other arrangements.

Figure 5:
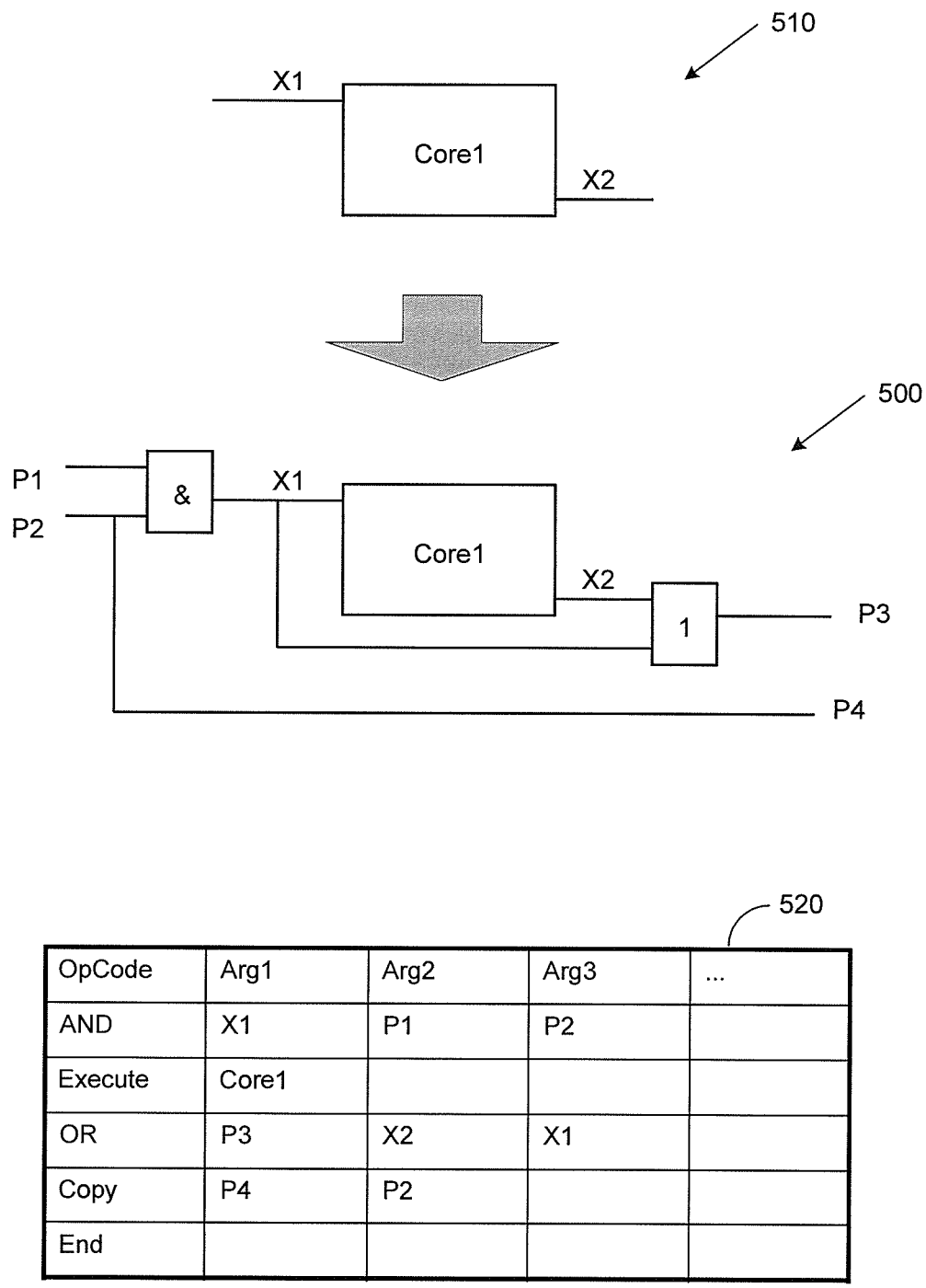
FIG. 5 illustrates an example use of a customized function block and parametric block type in accordance with this disclosure.

FIG. 5 illustrates an example use of a customized function block and parametric block type in accordance with this disclosure. The embodiment depicted in FIG. 5 is for illustration only. Other embodiments could be used without departing from the scope of this disclosure.

As shown in FIG. 5, a block diagram 500 represents a customized function block that is based on a standard function block 510. The standard function block 510 could represent a Device-Control function block developed by HONEYWELL and pre-loaded into the firmware of some HONEYWELL controllers. The Device-Control function block may be used to control certain types of process equipment, such as valves or motors. The Corel block represents an existing function of a HONEYWELL controller included in the Device-Control function block. X1 and X2 represent an example input and output for the Corel block. The Device-Control function block may include other inputs, outputs, parameters, and functions. However, for simplicity of explanation, these have been omitted.

Because of the wide variety of different equipment and different uses of equipment, some plant operators prefer a different set of functions than those pre-loaded in the Device-Control function block. Also, as processes change, the desired functions of the function block can change over time. Likewise, the desired functions of a function block can differ from customer to customer. However, the differences between two different customers (or between a customer at one time and the same customer at a later time) might be small (such as less than five percent difference). Thus, a technique for customizing an existing function block with a few new parameters or functions may be preferable to having to redevelop a new function block and distribute the new function block to one or more customers in a major firmware release.

The block diagram 500 depicts one example of a customization to the function block 510. In the customized function block 500, the customer includes new inputs and outputs for the function block 510. Parameters P1-P4 are customized parameters that represent new inputs or outputs for the Corel block, thereby "hiding" X1 and X2. That is, parameters P1 and P2 are new inputs that hide the existing input X1. Parameters P3 and P4 are new outputs that hide the existing output X2.

A parametric block type associated with the customized function block 500 may include a table 520 as shown in FIG. 5. The table 520 includes various operation codes (OpCodes) and parameters that represent instructions for the customized function block 500. The parameters in the table 520 include different input and output arguments, such as P1-P4, X1, and X2. The parametric block type, including the table 520, may be represented in a text file and loaded to be accessed by the parametric block engine. Once the new parameters P1-P4 are defined in the parametric block type and executed by the parametric block engine, an end user may no longer be aware of, or have a need to manage, X1 and X2.

Although FIG. 5 illustrates one example use of a customized function block and parametric block type, various changes may be made to FIG. 5. For example, the customized function block 500 may have more than four or fewer than four new parameters. As another example, the customized function block 500 may replace an existing OR gate with an AND gate.

Figure 6:
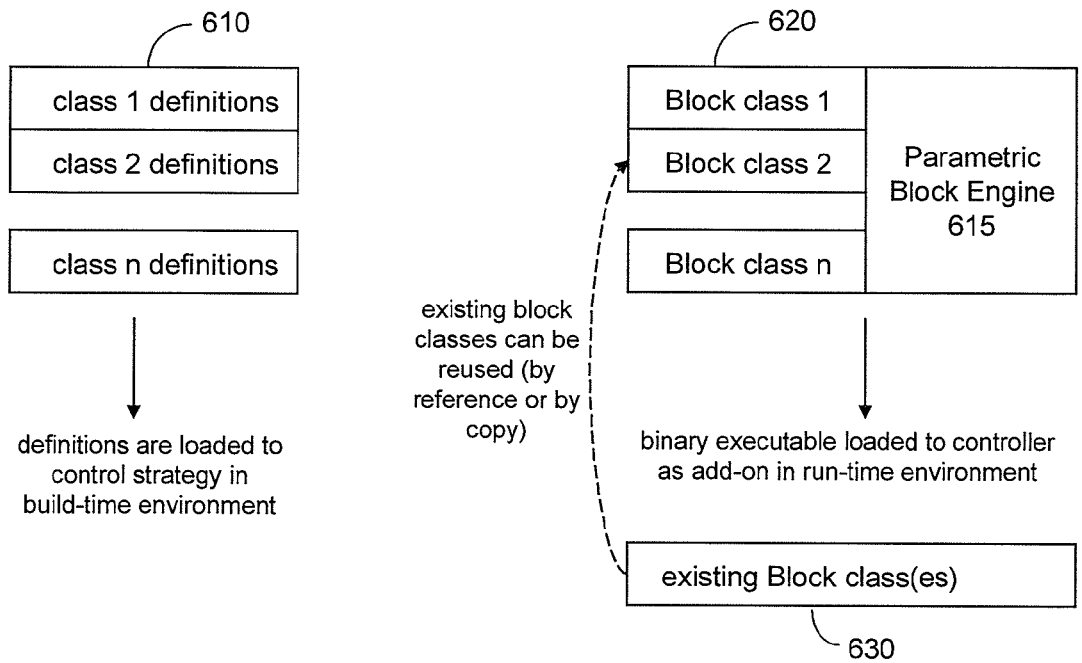
FIG. 6 illustrates an example logical structure of a toolkit in accordance with this disclosure.

FIG. 6 illustrates an example logical structure of a toolkit in accordance with this disclosure. The embodiment depicted in FIG. 6 is for illustration only. Other embodiments could be used without departing from the scope of this disclosure.

In the toolkit, each parametric block type includes one or more class definitions 610. The class definitions 610 represent the "public interface" for the blocks. That is, the class definitions 610 provide a public declaration of the functionality of the blocks. The class definitions 610 can be loaded and installed into a build-time environment as part of the parametric block types. Each class definition 610 may include a number of parameters (for instance, Class 1 may include the parameters P1-P4). A parametric block engine 615 reads and instantiates the class definitions 610 into block classes 620.

The toolkit may also reuse proven, complex functions that are defined in existing block classes 630. The existing block classes 630 may be reused by reference or by copy. If the reuse is by copy, the customer application can be protected against unintended side effects of controller firmware upgrades. However, the customer application may not benefit from future improvements made to the existing block classes 630. If reuse is by reference, the customer application can benefit from any enhancements or fixes to those functions in the controller firmware without any update of the toolkit or change in engineering.

Although FIG. 6 illustrates one example of a logical structure of a toolkit, various changes may be made to FIG. 6. For example, there may be more or fewer new class definitions and block classes than shown in FIG. 6.

Figure 7:
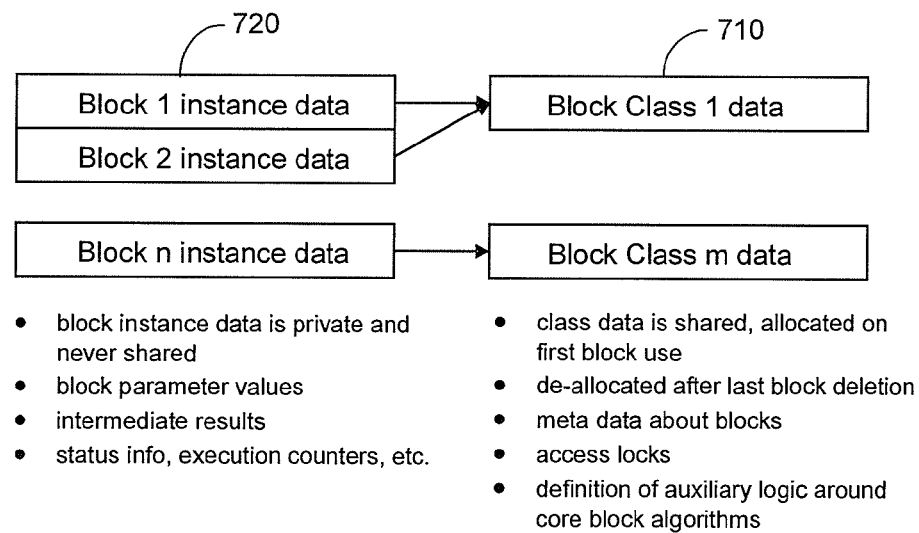
FIG. 7 illustrates an example of data allocation in an embedded controller at runtime in accordance with this disclosure.

FIG. 7 illustrates an example of data allocation in an embedded controller at runtime in accordance with this disclosure. The embodiment depicted in FIG. 7 is for illustration only. Other embodiments could be used without departing from the scope of this disclosure.

As shown in FIG. 7, the customized function blocks are associated with block class data 710 and block instance data 720. The block classes of the customized function blocks (such as block classes 620) are represented in the parametric block types through data, not functions. Thus, the block class data 710 represents the block classes. For example, the block class data 710 may define the logical interconnects between the different logical functions, such as those seen in the table 520 in FIG. 5.

The block instance data 720 represents the actual values of the parameters in each instance of a customized function block. For example, the block instance data 720 may include actual values of parameters P1-P4 in FIG. 5 at a certain point in time.

Although FIG. 7 illustrates one example of data allocation in an embedded controller at runtime, various changes may be made to FIG. 7. For example, the embedded controller may include any number of block class data 710 and block instance data 720.

Figure 8:
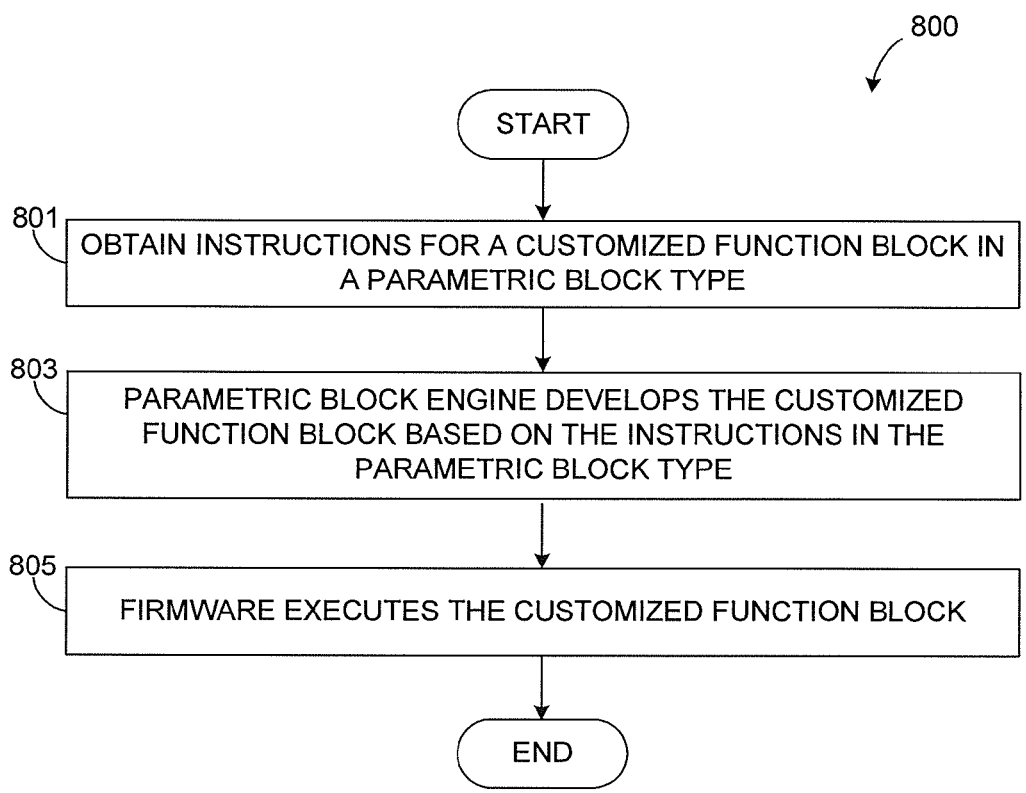
FIG. 8 illustrates an example method for providing reusable customized function block libraries in accordance with this disclosure.

FIG. 8 illustrates an example method 800 for providing reusable customized function block libraries in accordance with this disclosure. The method 800 may be performed in association with the process control system 100 of FIG. 1 and the workflow delivery model 300 of FIG. 3. The method 800 could be used with any other system.

Initially, at step 801, instructions for a customized function block are obtained in a parametric block type. The instructions for the customized function block may be embodied in a tabular format in a text file and may be simple enough to develop without requiring advanced software development skills. The customized function block may be executable in firmware in a controller in a process control system.

At step 803, a parametric block engine develops the customized function block based on the instructions in the parametric block type. This may include instantiating and executing one or more block classes defined in the parametric block type. In some embodiments, the parametric block engine may be pre-loaded into the controller before the controller is installed or otherwise activated in the process control system. In other embodiments, the parametric block engine may be deployed in the controller after the controller is installed or otherwise activated.

At step 805, firmware in the controller executes the customized function block. The customized function block is configured to be implemented at the controller between execution cycles while the controller is executing without taking the controller off-line.

Although FIG. 8 illustrates one example of a method 800 for providing reusable customized function block libraries, various changes may be made to FIG. 8. For example, while shown as a series of steps, various steps shown in FIG. 8 could overlap, occur in parallel, or occur multiple times. Moreover, some steps could be combined or removed and additional steps could be added.

The embodiments disclosed here can provide a parametric block engine configured as a workflow delivery component in a four-tier business delivery mechanism. Using this type of mechanism, a process control system provider can protect its intellectual property and the reputation of its platform. Likewise, plant operators can protect their commercial interests through workflow customization.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining instructions for a customized function block in a parametric block type, the parametric block type comprising one or more block class definitions;
   developing, at a parametric block engine, the customized function block based on the instructions in the parametric block type; and
   executing the customized function block;
   wherein the parametric block type further comprises a table including one or more operation codes or parameters that represent the instructions for the customized function block, the one or more operation codes or parameters configured to replace at least one input or output of a pre-existing function block with at least one customized input or output of the customized function block.

2. The method of claim 1, wherein executing the customized function block comprises executing the customized function block using firmware associated with a controller in a process control system.

3. The method of claim 2, wherein the parametric block engine is pre-loaded into the controller before the controller is activated in the process control system.

4. The method of claim 2, wherein the customized function block is implemented at the controller between execution cycles while the controller is executing without taking the controller off-line.

5. The method of claim 2, wherein the customized function block is implemented at the controller without re-releasing firmware of the controller.

6. The method of claim 1, wherein the instructions for the customized function block are embodied in a text file.

7. The method of claim 1, wherein the instructions for the customized function block are developed without requiring advanced software development skills.

8. The method of claim 1, wherein developing the customized function block comprises instantiating and executing one or more block classes defined according to the one or more block class definitions in the parametric block type.

9. A system comprising:
    at least one memory configured to store a parametric block type comprising instructions for a customized function block, the parametric block type comprising one or more block class definitions; and
    at least one processing unit programmed to execute a parametric block engine configured to develop the customized function block based on the instructions in the parametric block type;
    wherein:
        the system is configured to execute the customized function block; and
        the parametric block type further comprises a table including one or more operation codes or parameters that represent the instructions for the customized function block, the one or more operation codes or parameters configured to replace at least one input or output of a pre-existing function block with at least one customized input or output of the customized function block.

10. The system of claim 9, wherein the at least one processing unit is programmed to execute the customized function block using firmware associated with a controller in a process control system.

11. The system of claim 10, wherein the parametric block engine is configured to be pre-loaded into the controller before the controller is activated in the process control system.

12. The system of claim 10, wherein the customized function block is configured to be implemented at the controller between execution cycles while the controller is executing without taking the controller off-line.

13. The system of claim 9, wherein the instructions for the customized function block are embodied in a text file.

14. The system of claim 9, wherein the parametric block engine is configured to develop the customized function block by instantiating and executing one or more block classes defined in the parametric block type.

15. A tangible non-transitory computer readable medium encoded with a computer program, the computer program comprising computer readable program code for:
    obtaining instructions for a customized function block in a parametric block type, the parametric block type comprising one or more block class definitions;
    developing, at a parametric block engine, the customized function block based on the instructions in the parametric block type; and
    executing the customized function block;
    wherein the parametric block type further comprises a table including one or more operation codes or parameters that represent the instructions for the customized function block, the one or more operation codes or parameters configured to replace at least one input or output of a pre-existing function block with at least one customized input or output of the customized function block.

16. The tangible non-transitory computer readable medium of claim 15, wherein the computer readable program code for executing the customized function block comprises computer readable program code for executing the customized function block using firmware associated with a controller in a process control system.

17. The tangible non-transitory computer readable medium of claim 16, wherein the parametric block engine is pre-loaded into the controller before the controller is activated in the process control system.

18. The tangible non-transitory computer readable medium of claim 16, wherein the customized function block is implemented at the controller between execution cycles while the controller is executing without taking the controller off-line.

19. The tangible non-transitory computer readable medium of claim 15, wherein the instructions for the customized function block are embodied in a text file.

20. The tangible non-transitory computer readable medium of claim 15, wherein the computer readable program code for developing the customized function block comprises computer readable program code for instantiating and executing one or more block classes defined according to the one or more block class definitions in the parametric block type.

* * * * *